(12) United States Patent  (10) Patent No.: US 7,411,159 B2
Oosterling  (45) Date of Patent: Aug. 12, 2008

(54) DEVICE AND METHOD FOR THE HEATING OF FOOD

(75) Inventor: Pieter Adriaan Oosterling, IJzendijke (NL)

(73) Assignee: Tumble-Woc B.V., Vijfhuizen (NL)

( * ) Notice: Subject to any disclaimer, the term of this patent is extended or adjusted under 35 U.S.C. 154(b) by 581 days.

(21) Appl. No.: 11/028,400

(22) Filed: Jan. 3, 2005

(65) Prior Publication Data

US 2005/0183716 A1   Aug. 25, 2005

(30) Foreign Application Priority Data

Dec. 31, 2003   (NL) ................................... 1025156

(51) Int. Cl.
*A47J 37/04*   (2006.01)
*A47J 37/12*   (2006.01)
(52) U.S. Cl. .................... 219/400; 219/389; 99/476; 99/371; 99/427; 99/443 R
(58) Field of Classification Search ........................ None
See application file for complete search history.

(56) References Cited

U.S. PATENT DOCUMENTS

| 4,901,633 | A | * | 2/1990 | De Longhi | ................... | 99/409 |
|---|---|---|---|---|---|---|
| 5,513,558 | A | * | 5/1996 | Erickson et al. | ........... | 126/21 A |
| 5,699,722 | A | * | 12/1997 | Erickson et al. | ............. | 219/400 |
| 5,910,264 | A | * | 6/1999 | Dauliach | .................... | 219/389 |
| 2003/0159687 | A1 | * | 8/2003 | Stephan | ...................... | 219/400 |
| 2004/0262283 | A1 | * | 12/2004 | Oosterling | .................. | 219/389 |

FOREIGN PATENT DOCUMENTS

WO   WO 01/24673 A1   10/2000

* cited by examiner

*Primary Examiner*—Joseph M Pelham
(74) *Attorney, Agent, or Firm*—Baker Botts L.L.P.

(57) ABSTRACT

The invention relates to a device for heating food comprising a frame, a pan or basket having an opening into which the food to be heated can be placed, which pan or basket can be coupled to the frame by means of coupling means and in which the frame comprises a heating element and a fan for circulating heated air in the pan or basket, and a drive for rotating the pan or basket about a non-vertical rotation axis during the heating of food in a heating position of the frame. The frame is designed such that the pan or basket can be coupled to the frame while the pan or basket is on a supporting surface with its opening directed upwards. The invention also comprises a method for heating food.

16 Claims, 4 Drawing Sheets

DEVICE AND METHOD FOR THE HEATING OF FOOD

BACKGROUND OF THE INVENTION

The invention relates to a device for heating food. A device of this type is known from WO 0124673, Hoebrigs. The drawback of the known device is that the pan or basket has to be filled with food through a small opening with the pan or basket being installed inside the device, which is awkward.

SUMMARY OF THE INVENTION

In order to overcome this disadvantage, the device is designed in that the frame is designed so that the pan or basket can be coupled to the frame of the device while the pan or basket is on a supporting surface and has its opening directed upward. As a result, the pan or basket can be filled in a simple manner while preventing the problem of food falling outside the pan or basket during filling.

In accordance with an improvement, the device is designed with supporting feet. As a result, it is readily possible to couple the pan or basket to the frame and keep it in the heating position during heating.

In accordance with an improvement, the device is designed with a frame that is tiltably connected to a baseplate. This ensures a stable arrangement of the device on a supporting surface.

In accordance with an improvement, the device is designed with a spring arranged between the frame and a baseplate. This ensures that little force is required to tilt the pan or basket to assume the heating position.

In accordance with an improvement, the device is designed with a sensor for detecting when the frame is in the heating position. As a result, the operation of the device is made dependent on the position of the frame, making it possible, for example, to make safeguards dependent on this position.

In accordance with a further improvement, the device is designed with a switch for switching on the drives, fan or heating element with sensor connected to the switch. As a result, switching on the drive, the heater and/or the fan can be made dependent on the position of the frame, as a result of which mistakes during use and thus potentially dangerous situations are avoided.

In accordance with a further improvement, the device is designed with resilient couplers for clamping the pan or basket against the frame. This ensures that the pan or basket can be uncoupled to the frame in a simple manner.

In accordance with a further improvement, the device is designed with resilient couplers that can be moved simultaneously into an uncoupled position by displacing a common ring. This ensures that the pan or basket can be uncoupled from the frame in a simple manner.

In accordance with a further improvement, the device is designed with couplers having a beveled edge. This ensures that the pan or basket can be coupled to the lid by placing the frame with the lid over the pan or basket and pressing the lid onto the pan or basket.

In accordance with an improvement, the device is designed with a coupler that can rotate in a bearing and a flexible ring is provided between the bearing and the coupler. This ensures that the thermal expansion resulting from the heating does not influence the play in the bearing.

In accordance with an improvement, the device is designed with the fan and heating element provided on a holder and the coupling means rotate with respect to the holder. This ensures that the fan and/or heating element have an approximately stationary position relative to the frame, as a result of which the power supply can be effected in a simple manner via a power lead.

In accordance with a further improvement, the device is designed with the motor mounted on the holder. This ensures that the motor can drive the fan directly, which is easier and leads to fewer failures in transmission belts and the like.

In accordance with an improvement, the device is designed with a pan made of heat resistant glass. This ensures that a pan is available which is easy to clean.

In accordance with a further improvement, the device is designed with a pan having a reflective layer. This ensures that better use is made of the radiation for browning and/or cooking the food.

In accordance with a further improvement, the device is designed with a pan having indentations. This ensures that the pan is easy to handle and prevents the food from simply sliding, as it is forced to roll over indentations.

In accordance with an improvement, the device is designed with a pan or basket having partitions. This ensures that various kinds of foods can be heated simultaneously.

In accordance with an improvement, the device is designed with the frame coupled to a manipulator for automatically coupling or uncoupling the pan or basket and tilting frame. This ensures that the food can be heated automatically, the device, for example, forming part of a machine for heating food automatically.

The invention also comprises a method. By means of this method, the pan or basket can be filled in a simple manner, the food, after the tilting as a result of the rotation of the food, being able to move and roll along the side wall of the pan or basket.

BRIEF DESCRIPTION OF DRAWINGS

The invention will be explained below with reference to a number of exemplary embodiments with the aid of a drawing, in which.

DETAILED DESCRIPTION OF DRAWINGS

Figure 1:
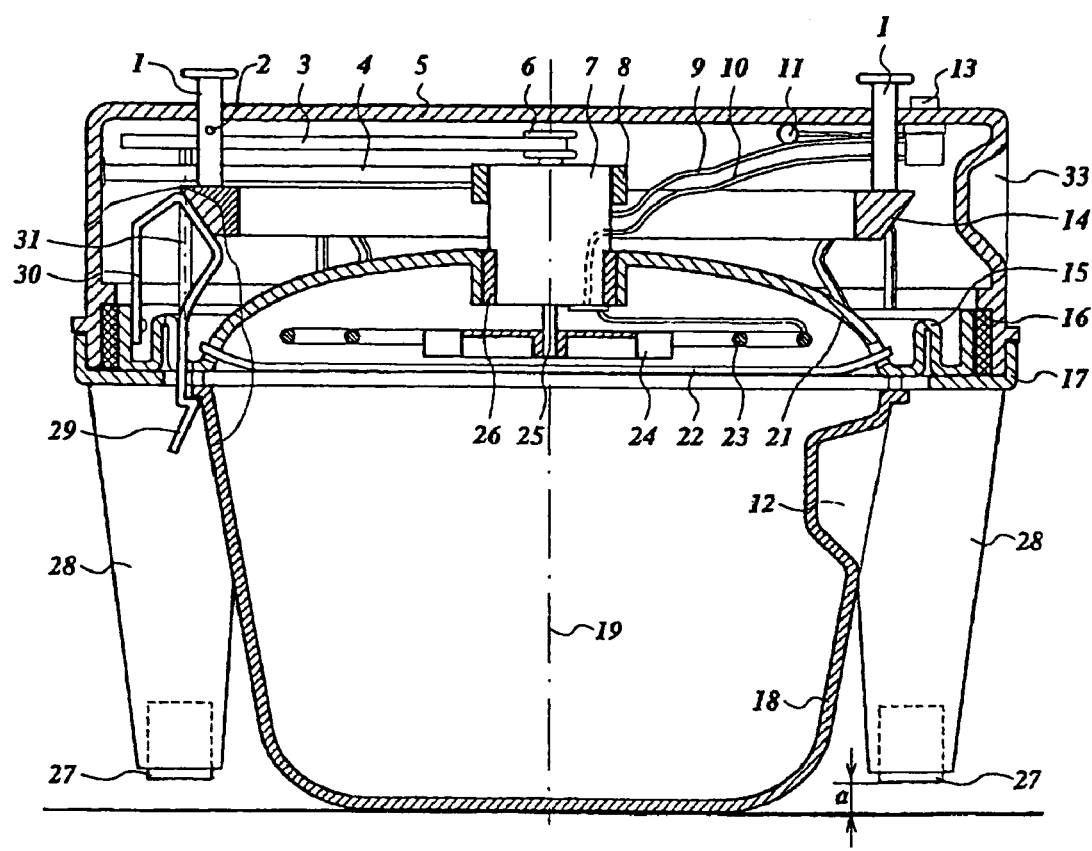
FIG. 1 shows a diagrammatic cross section through a first exemplary embodiment of a heating device for food.
Figure 2:
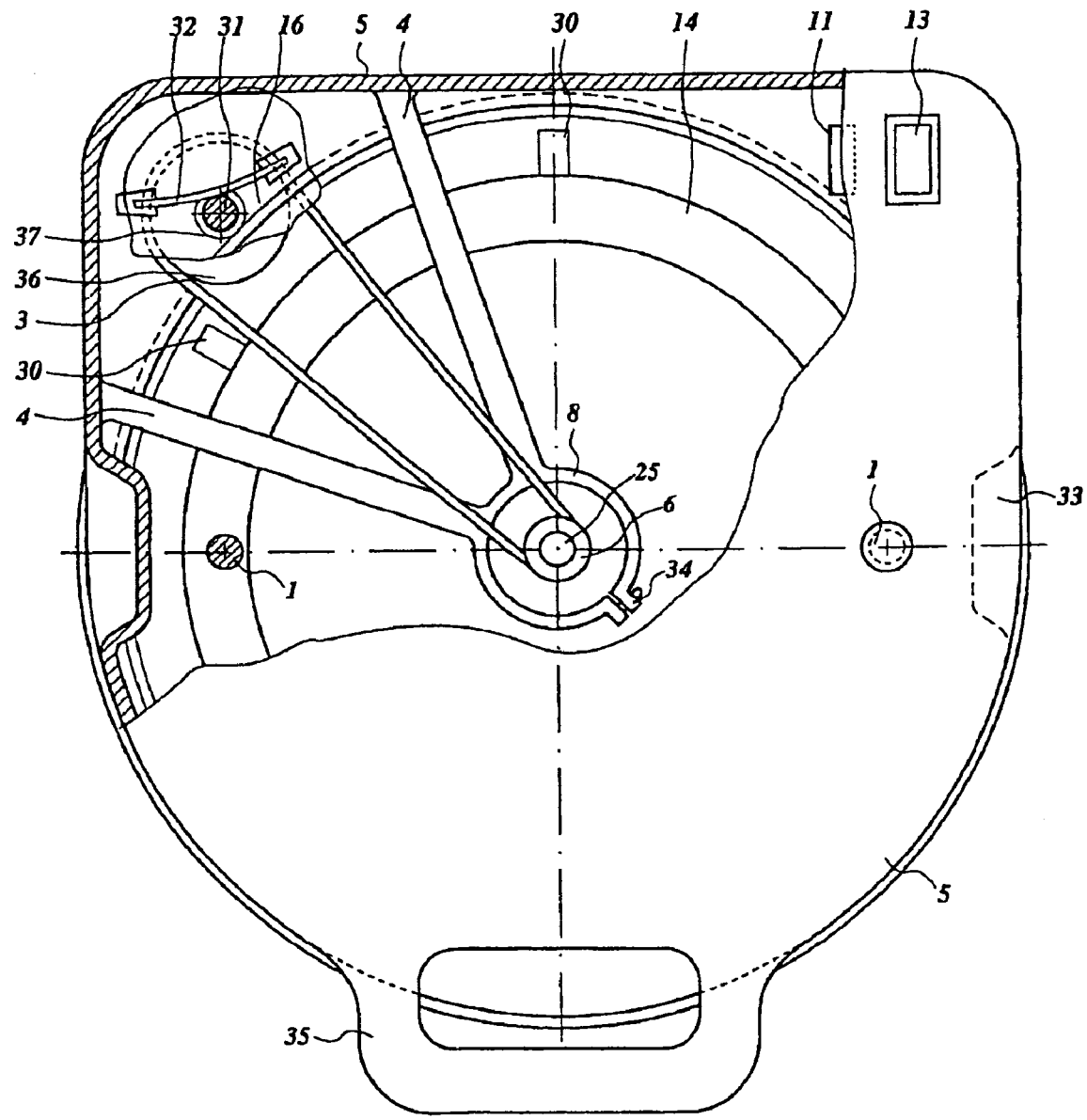
FIG. 2 shows a diagrammatic plan view of the device of FIG. 1 with a partially cut-away cover and a detail of the drive.
Figure 3:
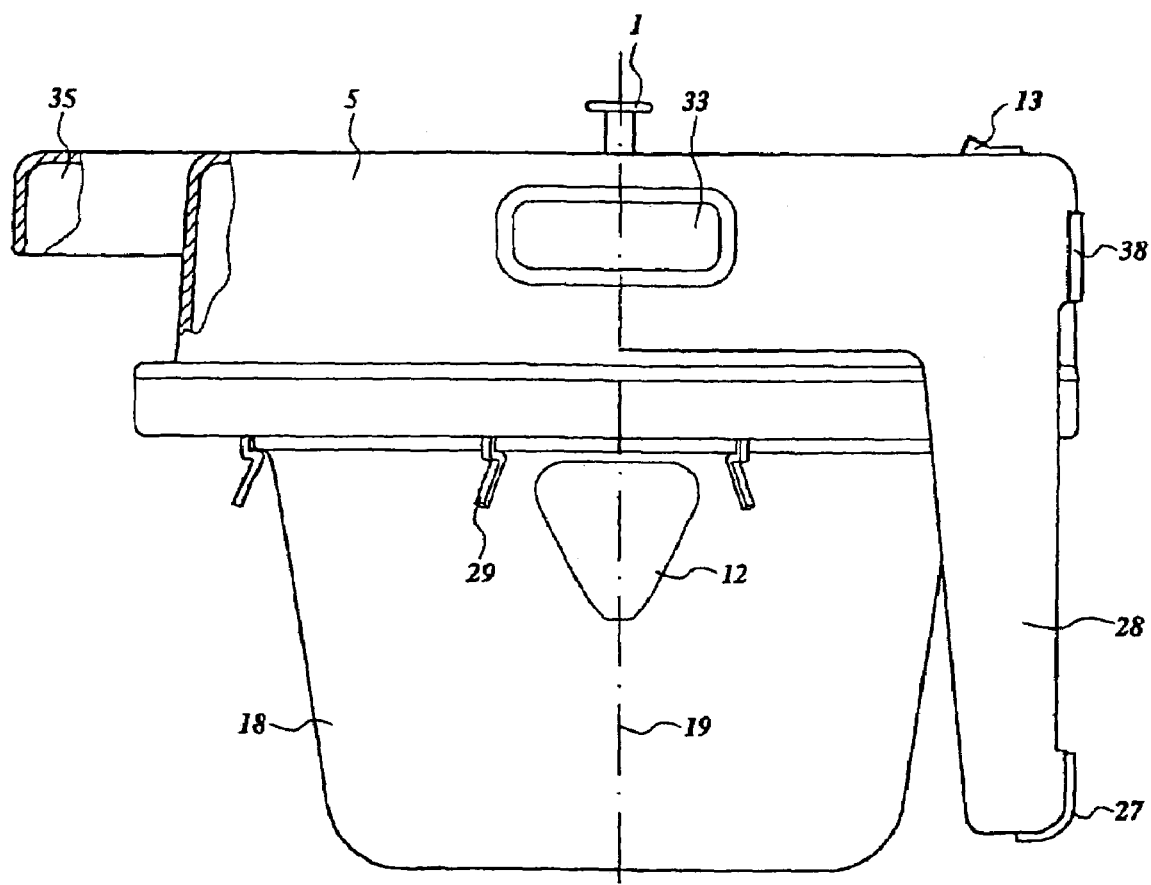
FIG. 3 shows a diagrammatic side view and a partial cross section of the device from FIG. 1.

The heating device shown in FIGS. 1, 2 and 3 comprises a lid 21 which can be coupled to a pan 18. The lid 21 is rotatably mounted in a cover 5 and is provided to this end at its circumference with a bearing ring 16 which can rotate in the cover 5 about a rotation axis 19 and which is positioned inside the cover 5 in the axial direction by, inter alia, an edge 17. The edge 17 protects the underside of the lid 21, preventing a user from accidentally touching the hot parts of the lid 21.

Six springs 30 are provided on the lid 21 for coupling the pan 18 to the lid 21, which springs are provided, at their loose ends with a hook 29 which can grip around an upper edge of the pan 18 (in FIG. 1, the springs 30 on the left-hand side of the figure have been drawn in a position which is rotated about thirty degrees for the sake of clarity). As the lid 21 is pressed onto the pan 18, the upper edge of the pan 18 presses the hooks aside until these hooks 29 fall around the upper edge and grip the pan 18 securely in such a manner that the pan 18 and the lid 21 are coupled. A resilient ring 20 is placed between the pan 18 and the lid 21 as a seal. This resilient ring 20 and the springs 30 are designed such that the hooks 29 can engage with the upper edge when the ring 20 is pressed, following which the ring 20 presses the upper edge downward in such a manner that the latter is pressed down against the hook 29.

On that side of the lid 21 which faces the pan 18, a coiled heating element 23 is arranged, as well as a fan 24. The fan 24 is attached to a shaft 25 of a motor 7. A grid 22 is arranged on the underside of the lid 21 on order to protect the heating element 23 and the fan 24. This grid 22 preferably consists of small-meshed gauze made of thin metal wire, so that a good permeability is ensured for the infra-red radiation emanating from the heating element 23. The grid 22 can be detached from the lid 21 for ease of cleaning.

In the embodiment shown, the lid 21 is made of metal, but it is likewise possible to use other materials. During switching on of the heating element 23 the lid 21 heats up, resulting in an increase in its diameter. An expansion rim 15 is provided between the part of the lid 21 which becomes hot and the bearing ring 16 which can absorb the increase in diameter of the heated part of the lid 21 so that the bearing play between the bearing ring 16 and the cover 5 does not become too small.

Before the pan 18 can be detached from the lid 21, the six hooks 29 have to be moved outwards simultaneously. In order to achieve this, a ring 14 rests on the springs 30, the springs 30 being shaped in such a manner that the hooks 29 move outwards when the ring 14 is pressed downwards. The springs 30 and the ring 14 rotate with the lid 21. The ring 14 has a flat top surface which moves under push-buttons 1 when the lid 21 rotates. By means of the push-buttons 1, the ring 14 can be pushed down as a result of which the hooks 29 move outwards and the pan 18 is detached from the lid 21 and the lid 21, together with the cover 5, can be lifted off the pan 18. The push-buttons 1 are pushed upwards by the springs 30 and the ring 14. The upward movement of the push-button 1 in the cover 5 is limited by a pin 2. Handles 33 are arranged in the cover 5 for easy operation of the push-buttons 1.

The motor 7 can rotate with respect to the lid 21, for which purpose a bearing ring 26 is incorporated in the lid 21, enabling this rotation. The motor 7 is clamped inside a holder 8 by means of a clamp 34. The holder 8 is coupled to the cover 5 by supports 4. The heating element 23 is fastened to the underside of the motor 7 and a supply lead 10 for the heating element 23 runs to a switch 13 via the underside of the motor 7. A supply lead 9 for the motor 7 also runs to the switch 13. The motor 7 is also used for rotating the lid 21 inside the cover 5. To this end, a pulley 6 is arranged on the shaft 25 at the top of the motor 7. A drive belt 3 is tensioned around the pulley 6 and also runs around a disc 36. The disc 36 is mounted on a shaft 31 which can rotate at the top in a bearing (not shown) mounted in the cover 5. At its bottom, the shaft 31 is provided with a drive roll 37 which is pressed against the bearing ring 16 by a spring 32. By selecting the diameters of the pulley 6, the disc 36 and the drive roll 37, the speed of rotation of the lid 12 and thus of the pan 18 can be selected.

The cover 5 is provided with two supports 28 which are dimensioned such that there is a distance a between the supports and a table when the rotation axis 19 is vertical and the pan 18 is on the table and clamped securely by the hooks 29. After tilting, when a rotation axis 19 of the pan 18 is horizontal, the supports 28 rest on the table by means of a support plate 27 and a support plate 38 and the pan 18 can rotate freely. In order to facilitate the tilting, a handle 35 is provided on the cover 5. It will be clear that it is also possible to have embodiments where the supports 28 and the support plates 27 and 38 are designed in such a manner that the rotation axis 18 is not at an angle of ninety degrees to the vertical when the support plates 27 and 38 rest on the table, but are at another angle, different from zero.

A sensor 11 is arranged in the cover 5 for detecting this tilted position in which the pan 18 can rotate freely. When the sensor 11 detects the tilted position, the heating element 23, the fan 24 and thus the rotational drive of the pan 18 can be switched on.

In use, the pan 18 described above is filled with food to be heated, coupled to the lid 21, and subsequently the pan 18 is tilted. Then, the heating element 23, the fan 24 and the drive of the lid 21 are switched on and the food is heated. After a few minutes, when the food is cooked, the heating element 23, the fan 24 and the drive of the lid 21 are switched off, the pan 18 is put on the table. Subsequently, the push-buttons 1 are pushed in, as a result of which the hooks 29 move outwards and the cover 5 can be lifted from the pan 18. The heated food can then be taken out of the pan 18.

It has been assumed in the embodiment shown that the pan 18 rotates continuously in the same direction. In a situation where the direction of rotation of the pan 18 vary and the rotation in one direction is in each case limited, the motor 7 can be securely mounted in the lid 21, while the supply leads 9 and 10 can run directly to the motor. In this case, however, a sensor and/or switch in order to limit the rotation is required. One possible embodiment may feature a reverse clutch between a motor and the pan 18, the sensor switching the reverse clutch and thereby reversing the rotational direction of the pan 18. Optionally, the drive for the pan 18 and the fan 24 are designed as separate units and there are two motors which can be operated independently. As a result, the use of the pulley 6, the disc 36 and the drive belt 3 is redundant, resulting in fewer failures.

The pan 18 may have a diameter of between 20 and 60 cm and a depth of 15 to 30 cm. The speed of rotation of the pan 18 is approximately 10 revolutions per minute, if desired between 5 and 15 revolutions per minute. Optionally, the supports 28 of the device are designed such that, during the heating, the pan rotates about an axis which is at an angle to the horizontal plane, for example an angle of thirty degrees, so that the food partially rests against the side wall and on the bottom of the pan 18 during heating.

The pan 18 may be made of heat-resistant glass. The surface of the glass is preferably metallized or the glass is made to be reflective in another way, so that the infra-red radiation from the heating element 23 reflects on the pan 18 and further heats the food present in the pan 18. Other embodiments are likewise possible, such as a metal pan or also a basket. In one embodiment, the pan 18 or basket, respectively, may be provided with partitions, which may be removable, if desired. In that case, different kinds of food are placed in the various compartments of the pan 18, which can be heated separately. Indentations 12 may be provided in order to be able to pick up the pan easily. These indentations may also be useful for moving the food in the pan 18, as these indentations interrupt any possible sliding of the food, so that it starts to "roll" and is better heated on all sides.

In the embodiment shown, a simple switch 13 is shown for operating the device. Obviously, the device may also be provided with features which prevent overheating of the heating element 23 and it is also possible to design the device to have a programmable controller, a timer and other features known for the use of the device in the preparation of meals.

It will be clear to those skilled in the art, that the above-mentioned cover 5 may be moved by a manipulator which, for example, forms part of a machine for heating food, rather than by a cook. Once the food has been place in the pan 18, if desired automatically, the cover 5 and the pan 18 are coupled by the manipulator and subsequently also tilted.

After heating, the pan 18 and the cover 5 are uncoupled by displacing the ring 14 using a drive fitted into the cover 5 for this purpose. The pan 18 is removed and automatically emptied, if desired, into a small tray which can be taken out of the machine. The machine may be provided with a payment system with selection means, so that an individual may, after payment, have a portion of food heated in the machine, with the machine carrying out the heating in the manner described above.

Figure 4:
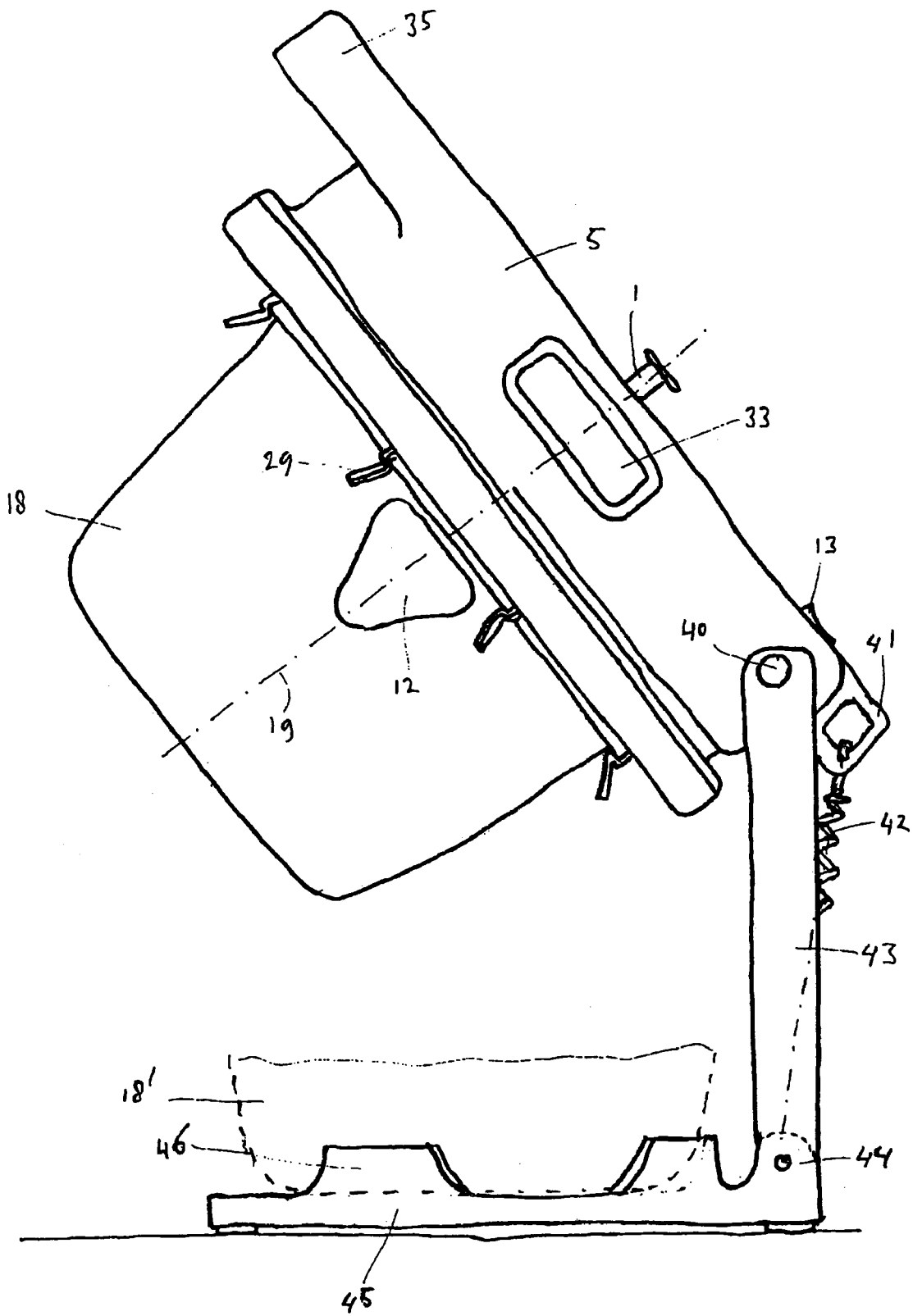
FIG. 4 shows a diagrammatic side view of a second exemplary embodiment of a heating device for food.

FIG. 4 shows a second embodiment of the heating device, in which most components are more or less identical to the components of the first exemplary embodiment. In the second embodiment, the cover 5 is pivotably attached between two supporting legs 43 by means of, inter alia, a hinge 40. The supporting legs 43 are attached to a baseplate 45 which may be placed on a worktop, for example. A fastening eye 41 is fixed to the cover 5 and a fastening eye 44 is fixed to the baseplate 45. A spring 42 is arranged between the fastening eyes 41 and 44, which spring is designed such that the cover 5 with all the components attached to it, and the pan 18 are tilted upwards by the effect of the spring force of the spring 42, in such a manner that the rotation axis 19 of the pan is at an angle with the vertical, as indicated in FIG. 4. Positioning projections 46 are fitted on the baseplate 45 into which the pan 18', indicated in FIG. 4 by a broken line, can be placed.

When using the heating device according to FIG. 4, the pan 18, which is filled with the foodstuffs to be heated, is placed on the baseplate 45 between the positioning projections 46. By pulling the handle 35, the cover 5 is pressed downwards until the hooks 29 grip around the rim of the pan 18 and the pan 18 is coupled to the cover 5. The force of the spring 42 lifts the pan 18 up until the rotation axis 19 of the pan is at an angle to the vertical. Then, the heating device is switched on, as described above. Once the foodstuffs are sufficiently heated, the pan is pressed between the positioning projections 46 again and the hooks are pressed outwards by pressing the buttons 1, causing the pan 18 to be detached from the cover 5. The cover 5 can now move upwards again and the pan 18 with the heated foodstuffs can be removed. It will be clear to those skilled in the art, that the hooks 29, the positioning projections 46 and the other components are designed such that the cover 5 is able to make this tilting movement. If desired, the pan can slide over the baseplate 45 during the movement or the hinge 40 is designed such that restricted horizontal movements of the cover 5 are possible.

The invention claimed is:

1. Device for heating food, comprising a frame tiltably coupled to a baseplate, a pan or basket having an opening into which the food to be heated can be placed, which pan or basket can be coupled to the frame by means of coupling means and in which the frame comprises a heating element and a fan for circulating heated air in the pan or basket, and a drive for rotating the pan or basket about a non-vertical rotation axis during the heating of food in a heating position of the frame, characterized in that the frame is designed such that the pan or basket can be coupled to the frame while the pan or basket is on the baseplate and has its opening directed upwards.

2. Device according to claim 1, in which a spring element is arranged between the frame and the baseplate for holding the frame in the heating position.

3. Device according to claim 1, in which a sensor is arranged in the frame for detecting whether the frame is in the heating position.

4. Device according to claim 3, in which the device has switching means for switching on the drive, the heating element and/or the fan, and the sensor is connected to the switching means.

5. Device according to claim 1, in which the coupling means are provided with resilient coupling elements for clamping the pan or basket against the frame.

6. Device according to claim 5, in which the resilient coupling elements can be moved simultaneously into an uncoupling position by displacing a common ring.

7. Device according to claim 5, in which the resilient coupling elements are provided with a bevelled edge, by means of which the pan or basket can press these outwards during the coupling of the pan or basket to the lid.

8. Device according to claim 1, in which the coupling means in the frame can rotate in a bearing and a flexible ring is provided between the bearing and the part of the coupling means which is near the heating element.

9. Device according to claim 1, in which the fan and the heating element are provided on a holder and the coupling means rotate with respect to the holder.

10. Device according to claim 9, in which the motor is mounted on the holder.

11. Device according to claim 1, in which the pan is made of heat-resistant glass.

12. Device according to claim 11, in which the pan is provided with a reflective layer.

13. Device according to claim 11, in which the pan is provided with indentations for use as a handle and/or stirring means.

14. Device according to claim 1, in which the pan or basket is provided with partitions.

15. Device according to claim 1, in which the frame is coupled to a manipulator for automatically coupling and/or uncoupling the pan or basket and tilting the frame.

16. Device according to claim 1, characterized in that the frame and the baseplate are designed such that the frame may be tilted from a resting position wherein the pan or basket is on the supporting surface with its opening directed upwards to the heating position.

* * * * *

UNITED STATES PATENT AND TRADEMARK OFFICE
CERTIFICATE OF CORRECTION

| | | |
|---|---|---|
| PATENT NO. | : 7,411,159 B2 | Page 1 of 1 |
| APPLICATION NO. | : 11/028400 | |
| DATED | : August 12, 2008 | |
| INVENTOR(S) | : Pieter Adriaan Oosterling | |

It is certified that error appears in the above-identified patent and that said Letters Patent is hereby corrected as shown below:

On the Title Page, Item (75) Inventor: Please correct the residence of the Inventor by deleting "IJzendijke" and replacing with --"Waterlandkerkje"--

Signed and Sealed this

Second Day of December, 2008

JON W. DUDAS
*Director of the United States Patent and Trademark Office*